US007010395B1

(12) United States Patent
Goldberg et al.

(10) Patent No.: US 7,010,395 B1
(45) Date of Patent: Mar. 7, 2006

(54) PC-PROGRAMMED IRRIGATION CONTROL SYSTEM

(75) Inventors: Allan Morris Goldberg, Laguna Niguel, CA (US); Larry Kent Hopkins, Escondido, CA (US); Randall Pearson, Chino Hills, CA (US); Larry Hawkes, San Diego, CA (US); Michael James Grundy, Phelan, CA (US)

(73) Assignee: The Toro Company, Bloomington, MN (US)

( * ) Notice: Subject to any disclaimer, the term of this patent is extended or adjusted under 35 U.S.C. 154(b) by 115 days.

(21) Appl. No.: 10/748,445

(22) Filed: Dec. 30, 2003

Related U.S. Application Data

(60) Provisional application No. 60/438,275, filed on Jan. 6, 2003.

(51) Int. Cl.
*G05D 7/00* (2006.01)
*G06F 3/00* (2006.01)

(52) U.S. Cl. ..................................... 700/284; 715/965
(58) Field of Classification Search ............ 700/83–85, 700/283–285, 306; 715/771–773, 848–855, 715/963, 965, 967
See application file for complete search history.

(56) References Cited

U.S. PATENT DOCUMENTS

| | | | | |
|---|---|---|---|---|
| 4,165,532 A | * | 8/1979 | Kendall et al. ............. 700/284 |
| 4,209,131 A | | 6/1980 | Barash et al. ................ 239/68 |
| 4,244,022 A | | 1/1981 | Kendall ....................... 700/284 |
| 4,304,989 A | | 12/1981 | Vos et al. ...................... 377/2 |
| 4,569,020 A | | 2/1986 | Snoddy et al. .............. 700/284 |
| 4,626,984 A | | 12/1986 | Unruh et al. ................... 700/3 |
| 4,646,224 A | | 2/1987 | Ransburg et al. ............ 700/14 |
| 4,827,155 A | | 5/1989 | Firebaugh ................ 307/141.4 |
| 4,852,051 A | * | 7/1989 | Mylne, III ................... 700/284 |
| 5,038,268 A | | 8/1991 | Krause et al. ................ 700/16 |
| 5,251,153 A | * | 10/1993 | Nielsen et al. .............. 700/284 |
| 5,278,749 A | | 1/1994 | De Man ....................... 700/14 |
| 5,331,619 A | * | 7/1994 | Barnum et al. ............. 700/284 |
| 5,363,290 A | | 11/1994 | Doup et al. ................... 700/16 |
| 5,444,611 A | | 8/1995 | Woytowitz et al. ........... 700/16 |
| 5,458,048 A | | 10/1995 | Hohner ......................... 91/459 |
| 5,742,500 A | * | 4/1998 | Irvin ............................. 700/9 |
| 5,746,250 A | | 5/1998 | Wick ..................... 137/624.11 |
| 5,921,280 A | | 7/1999 | Erickson et al. ........ 137/624.11 |
| 5,956,248 A | | 9/1999 | Williams et al. .............. 700/16 |
| 6,073,110 A | * | 6/2000 | Rhodes et al. ................. 705/8 |
| 6,098,898 A | | 8/2000 | Storch .......................... 239/69 |
| 6,102,061 A | | 8/2000 | Addink .......................... 137/1 |
| 6,259,970 B1 | | 7/2001 | Brundisini ................... 700/284 |

(Continued)

*Primary Examiner*—Maria N. Von Buhr
(74) *Attorney, Agent, or Firm*—Inskeep IP Group, Inc.

(57) ABSTRACT

A free-standing field irrigation controller is selectively programmed by a personal computer over a radio link. The computer is equipped with software that displays a screen with seven horizontal time bands representing one day each, arranged vertically to display one week's time. Box icons representing watering settings for a plurality of zones can be dragged and dropped onto the time bands, copied and modified thereon as desired, to form a freely selectable watering schedule. Other selectable screens allow odd-days or even-days watering, sophisticated interval watering, global watering time adjustment, and a variety of manual functions. Selectable portions of the main screen can be enlarged as desired. Based on the selected schedule, the computer calculates and displays the monthly cost of water. Selected zones can be temporarily disabled to deal with weather or maintenance issues. A handheld global shut-off and manual watering remote and/or a separate radio-linked computer may be used in field maintenance.

30 Claims, 17 Drawing Sheets

U.S. PATENT DOCUMENTS

| | | | |
|---|---|---|---|
| 6,298,285 B1 | 10/2001 | Addink et al. | 700/284 |
| 6,313,852 B1 * | 11/2001 | Ishizaki et al. | 715/751 |
| 6,490,505 B1 * | 12/2002 | Simon et al. | 700/284 |
| 6,535,771 B1 * | 3/2003 | Kussel | 700/83 |
| 6,694,195 B1 * | 2/2004 | Garcia | 700/26 |
| 6,823,239 B1 * | 11/2004 | Sieminski | 700/284 |

* cited by examiner

PC-PROGRAMMED IRRIGATION CONTROL SYSTEM

CROSS REFERENCE TO RELATED APPLICATIONS

This application claims the benefit of U.S. Provisional Application No. 60/438,275, entitled PC-Programmed Irrigation Control System, filed Jan. 6, 2003, the entire contents of which are hereby incorporated by reference.

FIELD OF THE INVENTION

This invention relates to irrigation control systems, and more particularly to a system using a free-standing field controller programmed by a conventional personal computer with the aid of a novel interactive graphic interface.

BACKGROUND OF THE INVENTION

Irrigation controllers are used in irrigation systems to electrically operate valves that deliver water under pressure to sprinklers or other distribution devices for watering turf or plants. Controllers are normally installed and programmed after the irrigation system has been designed. Technical skills and experience relating to such installations vary greatly from first-time do-it-yourselfers to professional landscaping crews. Furthermore, once the watering schedules are set on initial installation, they need to be changed or adjusted from time to time to adapt the system to climate or seasonal changes, growth of plants, or unanticipated conditions of soil or topography that result in inadequate or excessive watering in some areas of the system.

During the design and installation of the irrigation system, the system is divided into zones, each of which irrigates an area of turf or plants having similar growth characteristics and consequently similar water needs. Thus, the amount and frequency of watering can be controlled uniformly and individually for any given grouping of vegetation in the system. The number and frequency of the periodic adjustments that need to be made to the system depends on the complexity of the landscaping and the changes in the variable water requirements.

Many of the controllers currently available on the market offer a wide array of features and options. These are typically accessed by dials, knobs, buttons and switches, while information is primarily displayed by alphanumeric displays and/or indicator lights. Thus, altering the watering schedule of a controller can be a bewildering, frustrating experience for users, such as homeowners, who seldom find it necessary to make schedule changes. The typical lack of intuitive controls, the often obscure instructions in manuals, and an installer's reluctance to spend time training the user exacerbate that problem.

Worse yet is the not uncommon situation where the 24V AC power fails when the back-up battery that retains data in memory during power failures has been allowed to wear out. In that case, all program information may be lost, and the user has to reprogram the whole system without the original installer's guidance.

As personal computers (PCs) have become more and more commonplace in homes, fairly complex irrigation control systems have been sold to homeowners and other users who are not very sophisticated in manually programming complex controllers, but who do own a PC. Such users are likely to be quite familiar with standard methods of interactively manipulating graphics. For example, most PC users intuitively know how to drag and drop icons by moving and clicking a mouse.

For such users, it is highly desirable to provide a user-friendly graphic interface which allows an operator to manipulate the settings of the field controller with a mouse, and visually observe the effect of his manipulations. In addition, it would be advantageous for users to have a means of allowing repair personnel in the field to perform diagnostic downloads and/or basic control functions, such as turning the water on and off at desired locations, without having to physically access the field controller or the PC. Also, it would be advantageous for users to see how different selections of watering settings would affect the cost of operating the irrigation system.

SUMMARY OF THE INVENTION

The present invention provides a centrally operated irrigation control system with an intuitive, interactive graphic operator interface by presenting to the operator a two-dimensional time-date chart on a PC screen. Color-coded icons representing the different zones of the system can be placed on the chart and manipulated so as to present to the operator a graphic picture of which zone will be watering how long, at what time and on which days. Clicking on other icons can shut off watering on selected days, start a manual watering cycle, or cause a selected setting to repeat at selected intervals or on selected days of the week or month.

Other screens, dialog boxes or icons provide more detailed information about individual zones, calculate the anticipated monthly or yearly cost of the water expended by the system as a result of the chosen settings, or selectively temporarily disable one or more malfunctioning zones.

The schedule and run time settings created by the operator on the PC screen are transmitted to a field controller when desired, and the PC polls the field controller to assure reliable communications by radio or other electronic means at frequent intervals, e.g. once per second, as long as the control program of this invention is running on the PC. The field controller's clock is synchronized with the PC's clock whenever a schedule is uploaded from, or downloaded to, the field controller. This prevents unintentional resetting of the field controller's clock e.g. between daylight saving and standard time. The field controller's transceiver acknowledges each transmission back to the PC. The transmitted schedules and settings for the field controller are stored in that controller and remain in effect until altered by the PC, even if the PC goes off line.

Thus, a significant aspect of the invention is that the field controller is a free-standing unit; i.e. it does not depend on the PC for its operation. Once it has been programmed by the PC, it continues to function on its own, with or without the PC, until its operation is purposely disabled or modified. This is important for several reasons. Firstly, the system of this invention does not tie up the PC unnecessarily. Secondly, a PC or radio link failure does not impede the scheduled functioning of the system. Thirdly, a landscape maintenance technician can (with an appropriate radio access code) download and/or modify the field controller's schedule and settings from his truck. This is useful for diagnostic purposes and for correcting inappropriately selected watering parameters without the homeowner having to be present. The homeowner receives the new schedule when he activates the inventive program or chooses, within the program, the menu option to upload the schedule from the field controller.

In one aspect of the invention, a handheld remote is provided to send water-off, manual-watering, and resume-operation radio signals to the field controller without changing its stored parameters. This is useful for maintenance personnel when checking the proper operation of the sprinkler heads.

BRIEF DESCRIPTION OF THE DRAWINGS

FIG. 2b is a block diagram of the field controller of FIG. 2a;

DESCRIPTION OF THE PREFERRED EMBODIMENT

Figure 1:
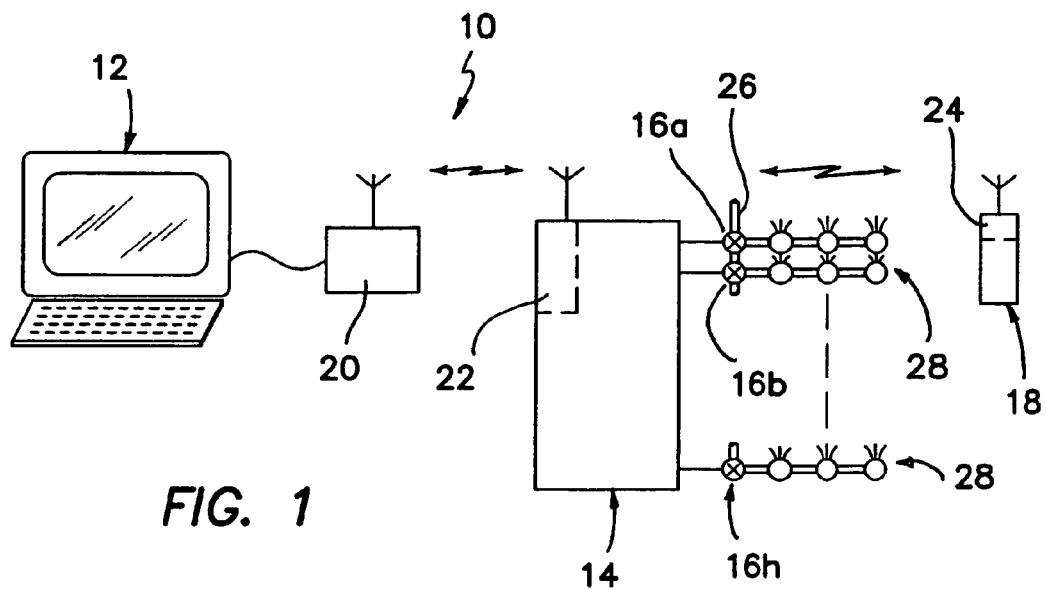
FIG. 1 is a block diagram of the system of this invention.

As shown in FIG. 1, the system 10 of this invention is composed of a PC 12, a field controller 14, zone valves or stations 16a through 16h (collectively referred to herein as stations 16), and optionally a handheld remote 18. Radio transceiver 20 connected to an appropriate USB or modem port of the PC 12, and transceiver 22 at the field controller 14, exchange schedule, setting and clock data between the PC 12 and the field controller 14. A transceiver 24 in the remote 18 allows the remote 18 to access the field controller 14 for limited purposes. Each of the stations 16 turns the water from a main 26 on or off, under the control of the field controller 14, to a set of sprinklers 28.

Figure 2A:
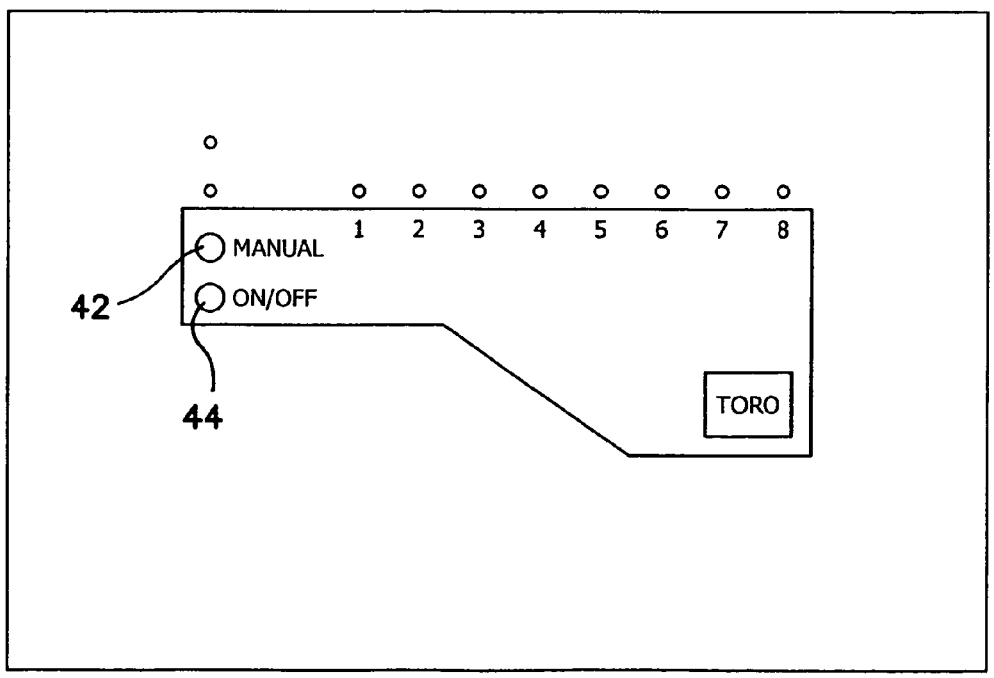
FIG. 2a is a front view of a typical field controller in the system of the invention.

The face plate of a typical field controller 14 in accordance with the invention is shown in FIG. 2a. A communications monitor LED 36 indicates operation of the radio link between the field controller 14 and the PC 12 and/or the remote 18. Zone Status LEDs 40a through 40h indicate the current status of the valves 16a through 16h, respectively, which control water flow to the sprinklers 28 in zones 1 through 8, respectively. Manual Start pushbutton 42 is provided to start a manual watering sequence and to switch from one zone to the next. Enable/Disable button 44 toggles between inhibiting and restoring all watering. Water-Off LED 56 is connected to the power supply 46 (FIG. 2b) in such a manner as to light steadily when watering is disabled, and to flash at intervals of e.g. four seconds under the power of a backup battery (not shown) in the power supply 46 to indicate an AC line power failure.

Figure 2B:
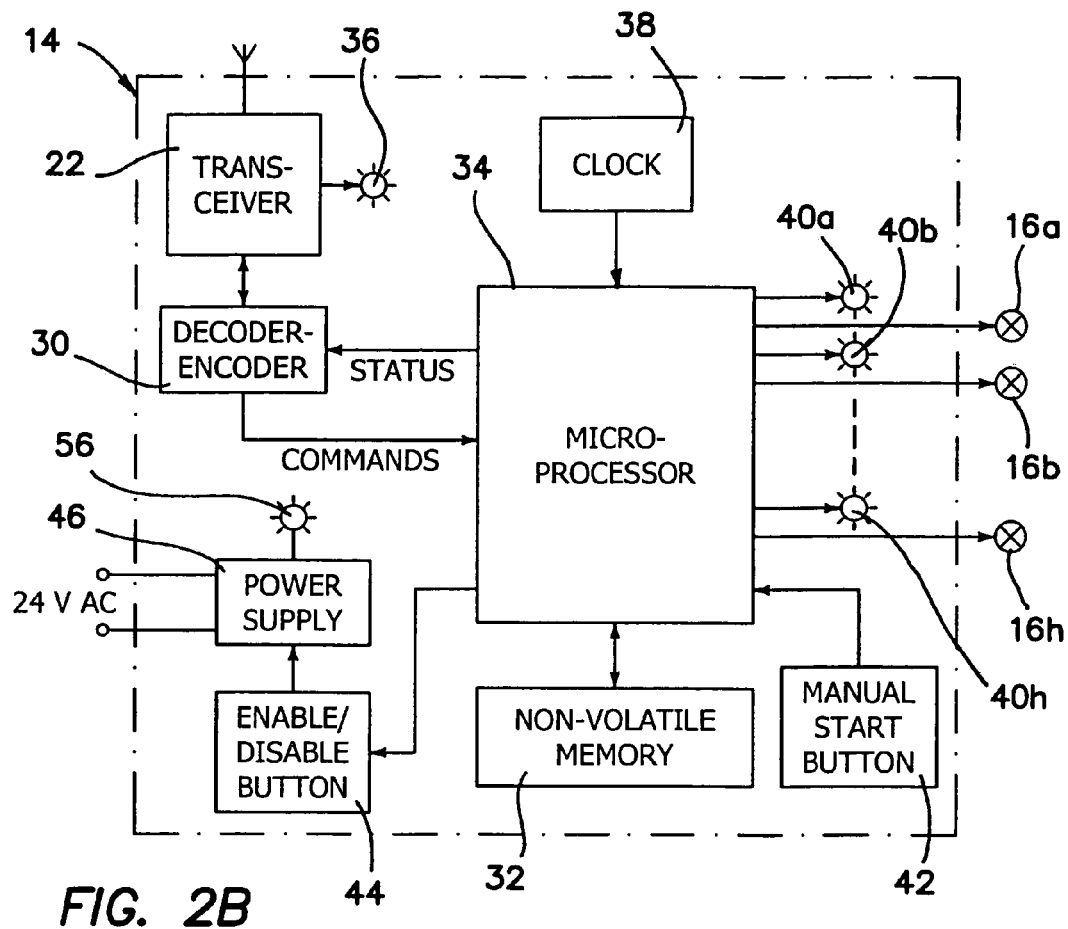

FIG. 2b shows the details of the free-standing field controller 14. Irrigation parameter and clock synchronization signals from the PC 12 of FIG. 1 are received by the transceiver 22 and decoded by the encoder/decoder 30. An access code may be embodied in the signals to assure that the field controller 14 responds only to its owner's PC. The received irrigation settings and schedules are stored in the non-volatile memory 32 by the microprocessor 34. The microprocessor 34 acknowledges receipt and execution of the transmission from the PC 12 by transmitting a status signal back to the PC 12. A status signal is also transmitted back to the PC 12 when the field controller 14 is polled by the PC 12 (typically about once per second while the PC program is running. The communications monitor LED 36 blinks whenever a good signal is received so that the proper operation of the communications link can be observed.

Under the control of its clock 38, and solely in response to the scheduling and setting data stored in memory 32, the microprocessor 34 turns power to the water valves or stations 16a through 16h on and off as the watering schedule stored in memory 32 dictates. Whenever power is on to one of the stations 16, the microprocessor 34 illuminates the corresponding one of the station LEDs 40a through 40h. When no watering is in progress, the microprocessor 34 scrolls the station LEDs 40a through 40h to indicate that the system is functional and standing by. No intervention by the PC 12 is required for the free-standing field controller 14 to perform these operations.

The controller 14 has two controls which may be in the form of the Manual Start pushbutton 42 and the Enable/Disable pushbutton 44. The Manual Start button 42 triggers the microprocessor 34 to energize station 16a for its run time as stored in the memory 32. A second push turns off station 16a and starts station 16b. A third push turns station 16b off and starts station 16c. Finally, the ninth push turns off station 16h and returns the microprocessor 34 to its automatic operation. If button 42 is pushed only once, each station will water in numerical sequence for its designated run time, and then return to automatic operation.

The Enable/Disable button 44 shuts all watering off by removing the operating power from the stations 16, while keeping the microprocessor 34 and radio transceiver 22 in operation. The Enable/Disable button can be physically pushed by an operator in the field, or actuated by a radio command signal from the PC 12 or the handheld remote 18.

Figure 3:
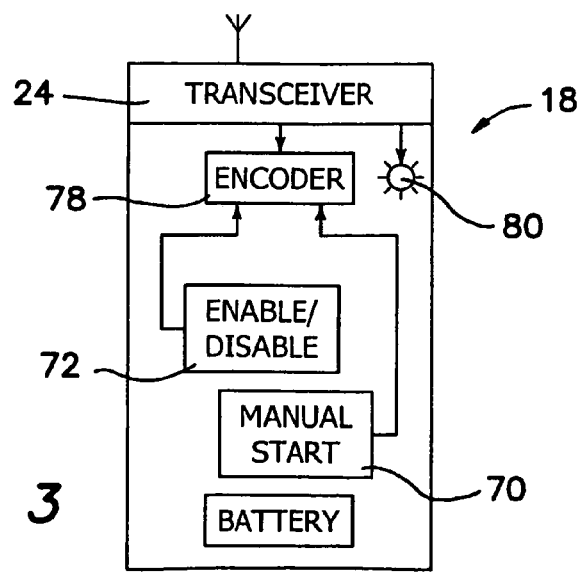
FIG. 3 is a block diagram of a handheld remote optionally used with the system of the invention.

Referring now to FIG. 3, the optional remote 18 has a Manual Start button 70 and an Enable/Disable button 72. An encoder 78 translates a button actuation into an appropriate code for transmission. The transceiver 24 is equipped with an LED 80 that lights when a signal is being transmitted or received. The LED 80 is programmed to blink twice if the addressed controller 14 is operational and acknowledges the transmission, once if the controller 14 is disabled, and not at all if the controller 14 is out of service and does not respond, or if a bad transmission is received.

FIGS. 4 through 19 illustrate the establishment and manipulation of watering schedules and settings in the system of the invention. When the inventive control program is first opened on the PC 12, the start-up or main graphic or screen 100 (FIG. 4) is initially presented to the user. The first two lines 102*a* and 102*b* of the menu bar 102 contain the standard operational icons of the Windows® operating system, adding only the Communications menu 104 and the Irrigation Tools menu 106. The Communications menu 104 allows the selection of ports for the connection of the transceiver 20 and the initiation of a data transfer to or from the field controller 14. The Irrigation Tools menu 106 allows the selection of the various types of screens discussed below.

The third line 102*c* of the menu bar 102 contains the special icons that activate the features of the inventive system. As described in more detail below, the Zone Display icon 108 brings up a Zones box or list 130 of all separately controllable zones. The No-Watering icon 109 toggles the field controller 14 of FIG. 2*a* on/off in the same manner as the enable/disable buttons 44 and 72 described above. The Communications icon 110 monitors the functioning of the radio link by showing radiating green circles when transmissions to the field controller 14 are being acknowledged, and red ones when they are not. The Percent icon 111 brings up the global adjustment bar of FIGS. 13 and 14 for globally increasing or decreasing all the watering times of all the zones in response to climatic changes or water conservation requirements. The Manual icon 112 brings up a set of screens which handle a variety of manual operations. The Plus and Minus icons 113, 115 enlarge and reduce, respectively, selected portions of the screen as described below. Undo and Redo icons 114 and 116 carry out standard editing functions of the Windows® operating system. The "100%" notation 119 indicates that the global adjustment (discussed below in conjunction with FIGS. 13 and 14) is set to 100%.

The Send icon 118 is normally grayed out. When the program of this invention is opened on the PC 12, the current schedule and settings stored in the field controller 14 are immediately uploaded for display on the PC 12. When any change is made to the uploaded information, the Send icon 118 becomes active. When it is then clicked, the PC 12 begins sending the selected or modified watering schedule and settings to the field controller 14. When the modified parameters have been successfully transmitted to the field controller 14, the Send icon 118 will momentarily change to "OK", after which the Send icon 118 grays out, the PC 12 resumes its continual polling of the field controller 14, and the screen again displays the status of the field controller 14. Pop-up reminder boxes (not shown) warn the operator if a modification has been made but not sent to the field controller 14 within a reasonable time.

The body of the start-up screen 100 displays horizontal time bands 120 arranged in a vertical series of days. The first day 122 of the series is always the current day as determined by the computer's internal clock. The screen 100 preferably displays seven time bands to form a repeating one-week setup. Two-week or four-week setups (i.e. setups that repeat every two or four weeks) can be chosen from the Irrigation Tools menu 106, in which case weeks preceding or following the displayed week can be accessed by clicking the up arrow 124 or the down arrow 126. A vertical line 128 shows the current time, in accordance with the computer's clock, on the midnight-to-midnight scale of the time bands 120.

In order to set up a watering schedule, the Zone Display icon 108 is clicked. This brings up the Zones box 130 (FIG. 5) which displays a valve icon 132 and an editable description box 134 for each of the separately programmable zones. A watering schedule is begun by dragging and dropping, in accordance with standard Windows® practice, a selected valve icon 132 onto a selected time band 120 at approximately the time position at which a watering cycle is selected to begin. (Note that in FIG. 5, the down arrow 126 has been clicked until the time bands 120 on the screen represent the sixth through twelfth days of a two-week setup).

Figure 6A:
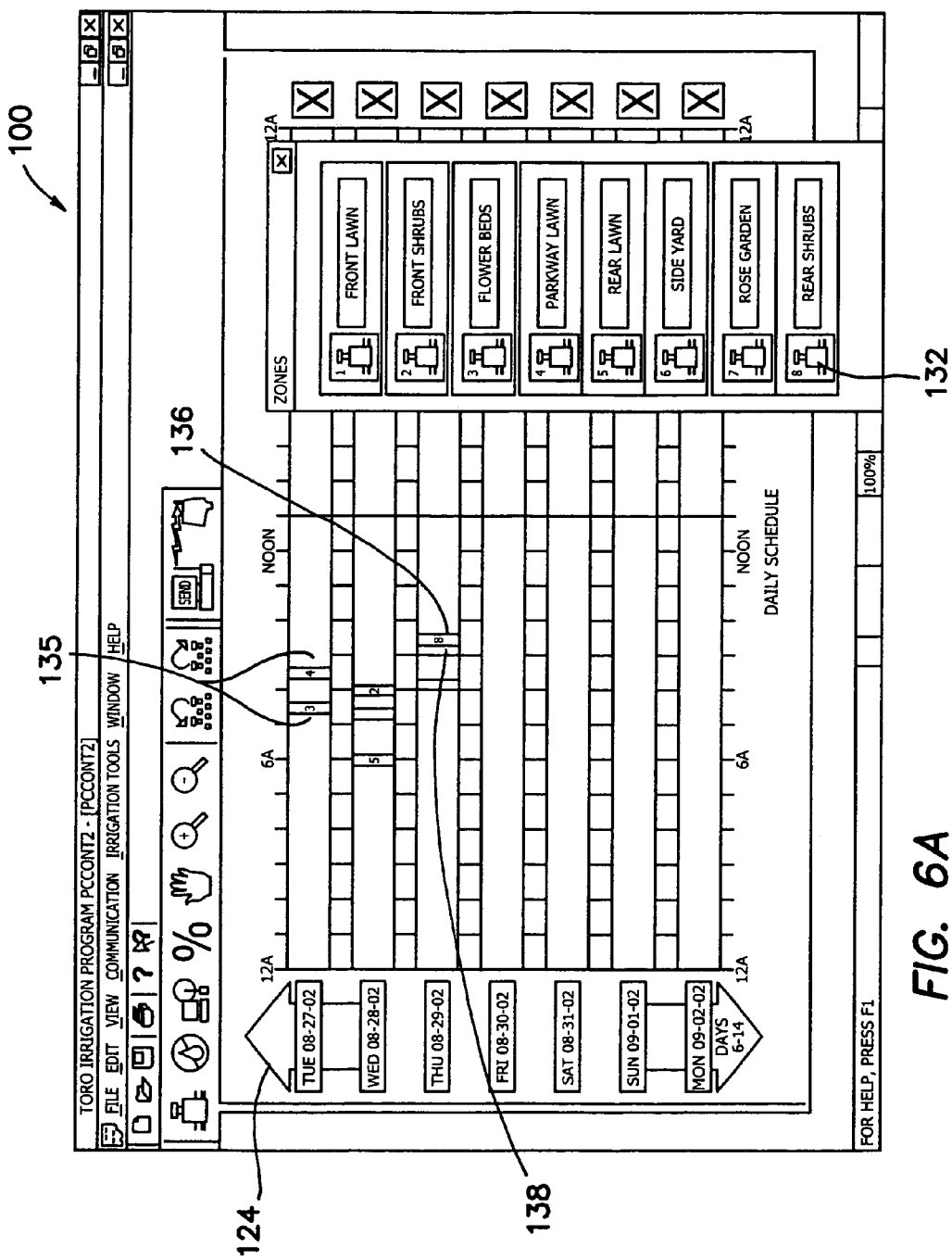
FIG. 6a shows the screen of FIG. 5 with zone schedules inserted.
Figure 6B:
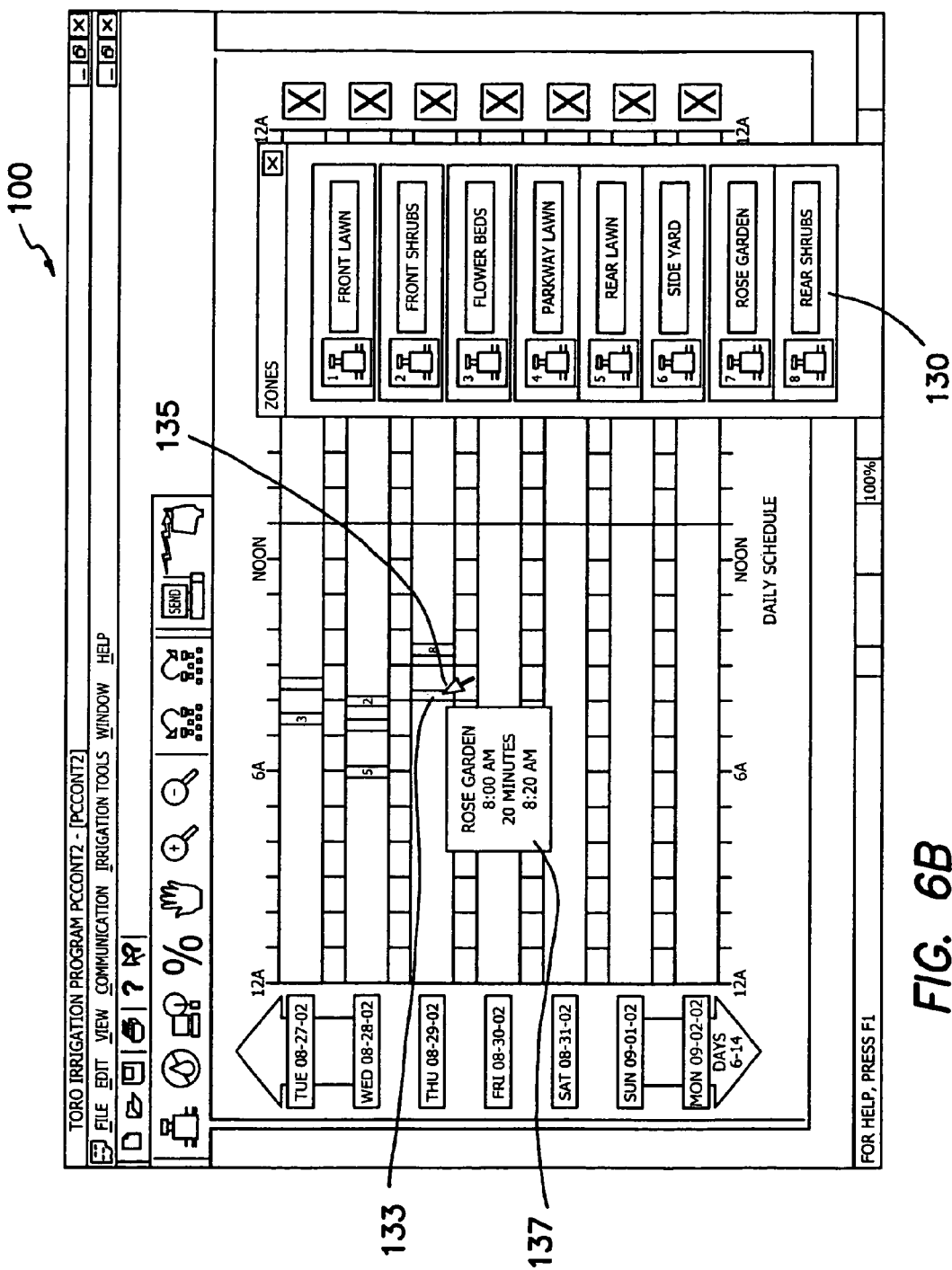
FIG. 6b shows the label produced by positioning the cursor over a schedule box.
Figure 7:
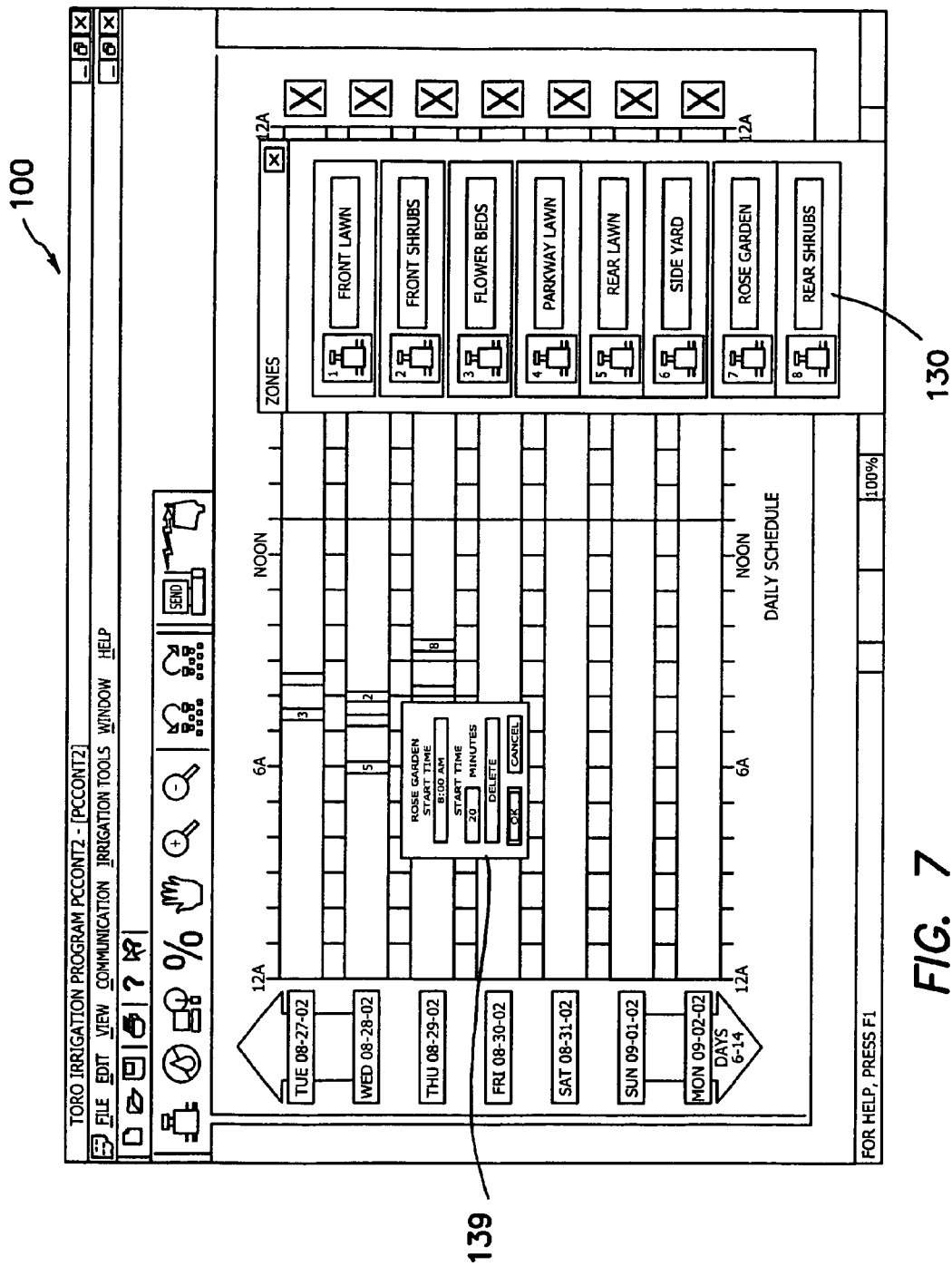
FIG. 7 shows the schedule dialog box.

Repeated dragging and dropping produces the screen of FIG. 6 (the up arrow 124 having been clicked to go back to a display of the first seven days of the two-week setup). Preferably, the valve or zone icons 132 are color-coded, and the schedule boxes 135 are correspondingly color-coded in addition to being numbered. It will thus be seen in FIG. 6 that the flower beds and parkway lawn get watered on Tuesday at about 7:15 am and 8:15 am, respectively; the rear lawn, front lawn and front shrubs get watered on Wednesday at about 5:55 am, 7:05 am and 7:55, respectively; and the rose garden gets watered at 8:00 am on Thursday. The side yard and rear shrubs get watered, one immediately after the other, beginning at 9:00 am on Thursday.

Because only one zone can normally be on at any given time, an attempt to drag schedule box 136 onto schedule box 138 causes schedule box 136 to jump back to a position immediately adjacent schedule box 138. Positioning the cursor 135 over a schedule box such as 133 brings up an information label 137 (FIG. 6*b*) that identifies the zone and shows its start time, run time and end time. Right-clicking a schedule box such as 136 brings up a dialog box 139 (FIG. 7) in which the user can modify the start time and run time, or delete the schedule box entirely. Incompatible selections chosen in the dialog box, such as overlapping run times, are rejected with an advisory pop-up box (not shown) indicating the inappropriate choice. Alternatively, a schedule box can be dragged to a different start time, and its right edge can be dragged to increase or decrease its run time.

Figure 8:
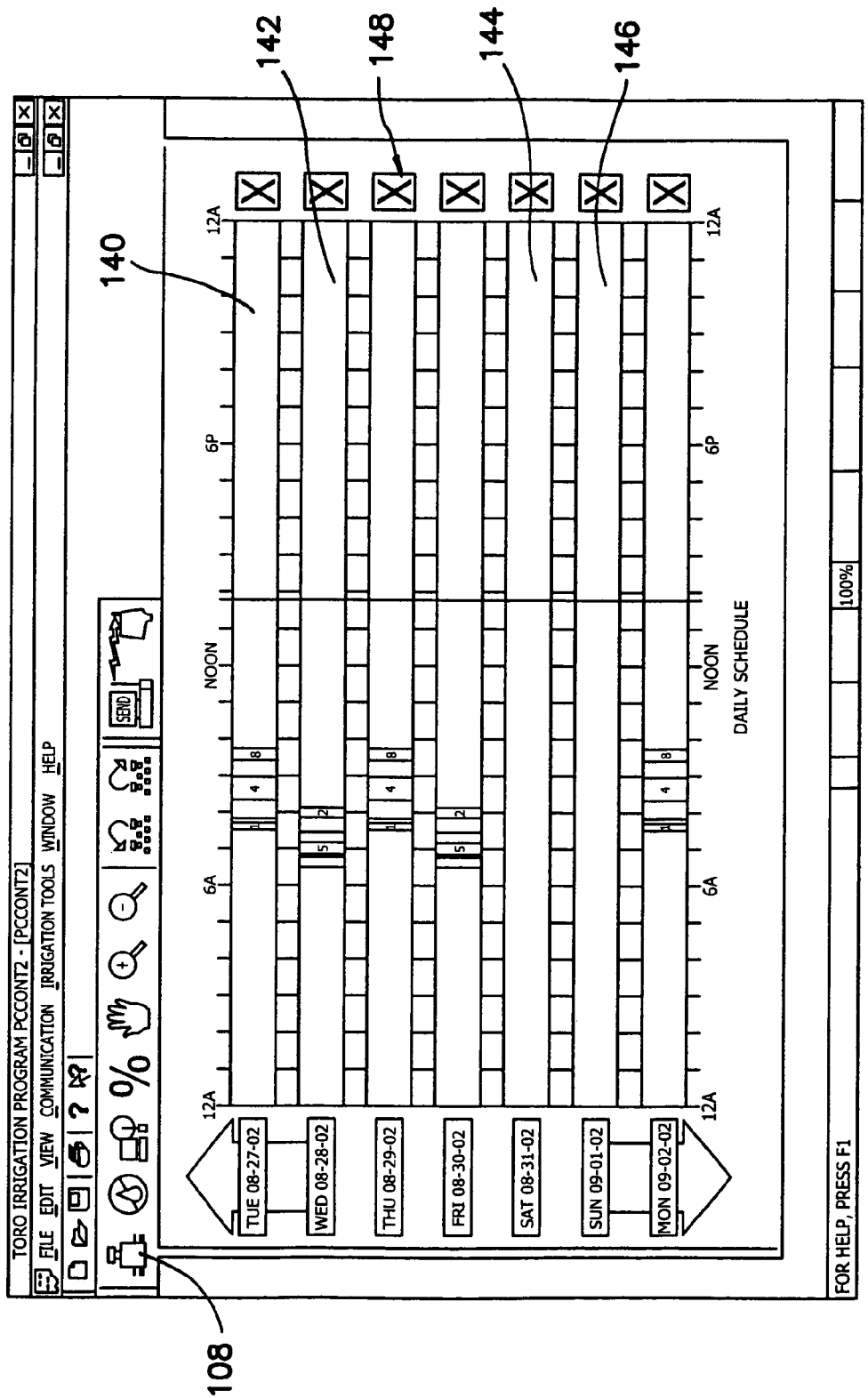
FIG. 8 shows the screen of FIG. 4 with alternate-days watering schedules entered thereon.

FIG. 8 (with the Zones box 130 now hidden by clicking Zone Display icon 108) illustrates a method of building a one-week schedule that waters alternate sets of zones on alternate weekdays. In that figure, the Tuesday schedule of zones 3, 7, 4 and 8 and the Wednesday schedule of zones 6, 5, 1 and 2 are first established in the manner discussed above in connection with FIG. 5. Next, the Tuesday time band 140 is selected and highlighted by double-clicking on it. Positioning the cursor over the thus selected time band produces a 4-way arrow. The highlighted time band can now be dragged to the desired day with the left mouse button. A copy of the time band 140 will thus be produced on the desired day. In like manner, the Wednesday band 142 is copied to the Friday band. The Saturday and Sunday bands 144, 146 are left blank. It will be noted that as the top band rotates to the bottom of the screen (with next week's date) at the end of the day, Monday's and Tuesday's schedules will not alternate but be the same. This can be avoided by setting up a two-week schedule.

To the right of each time band is a large X 148. Clicking that X highlights the time band and the X, and disables watering for that day only. This would be useful if the forecast for that day calls for rain. If an error is made in scheduling a given day, the error can be corrected by a conventional Edit-delete or Undo and reentry operation.

Figure 9:
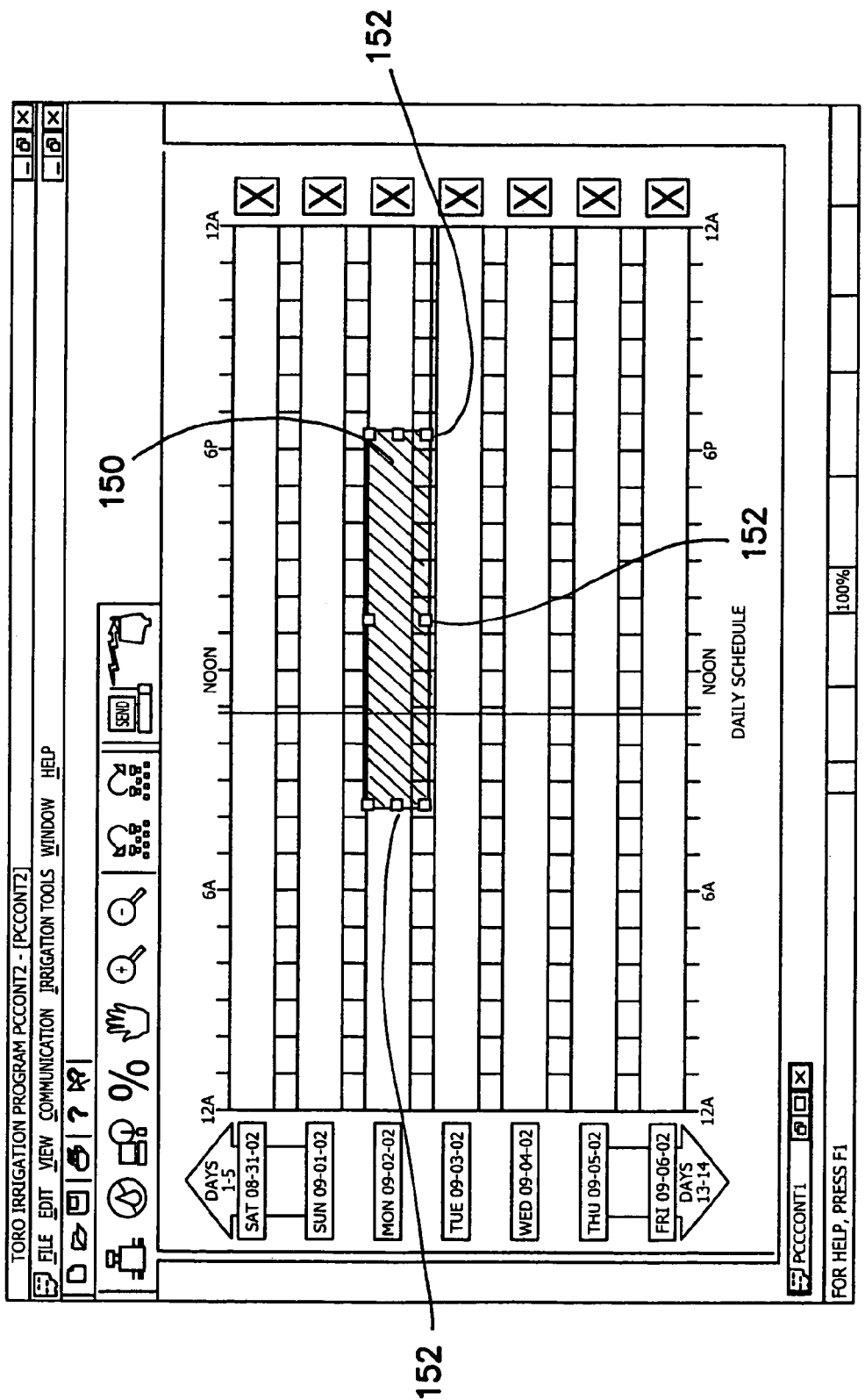
FIG. 9 shows a magnifying box on the screen of FIG. 8.
Figure 10:
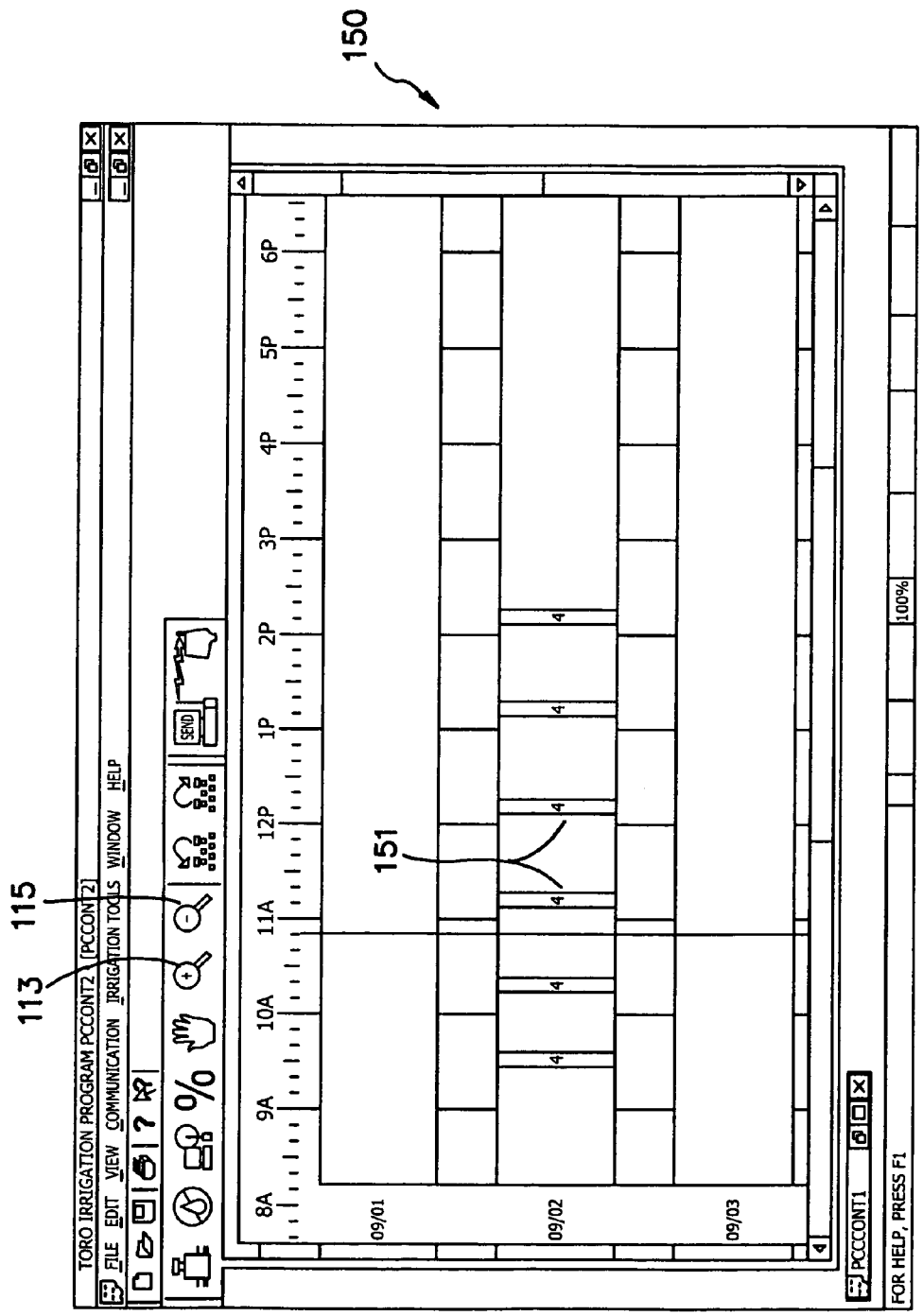
FIG. 10 shows a magnified section of the screen of FIG. 4 with a new-lawn schedule inserted.

FIGS. 9 and 10 illustrate the magnification of any desired area of the screen so that settings may be observed and manipulated more exactly. Clicking the Plus icon 113 magnifies the whole screen. Because this may move a desired portion of the screen out of view, a portion of the screen can alternatively be selected for magnification by dragging the mouse with the left button. This places a shaded box 150 over the image on the screen. The box 150 can be moved and sized by its handles 152 in accordance with standard Windows® drawing practice. When it has been placed and sized as desired, clicking the Plus icon 113 enlarges the area encompassed by the box 150 to fill the screen (FIG. 10). This is convenient, for example, when it is desired to schedule, by copying and pasting, a number of short, spaced waterings 151 as would be beneficial on a new lawn. The process of clicking the Plus icon 113 and/or creating a box 150 can be repeated as desired for increasing the magnification of the screen image. Clicking the Minus icon 115 reverses the process step by step.

Figure 11:
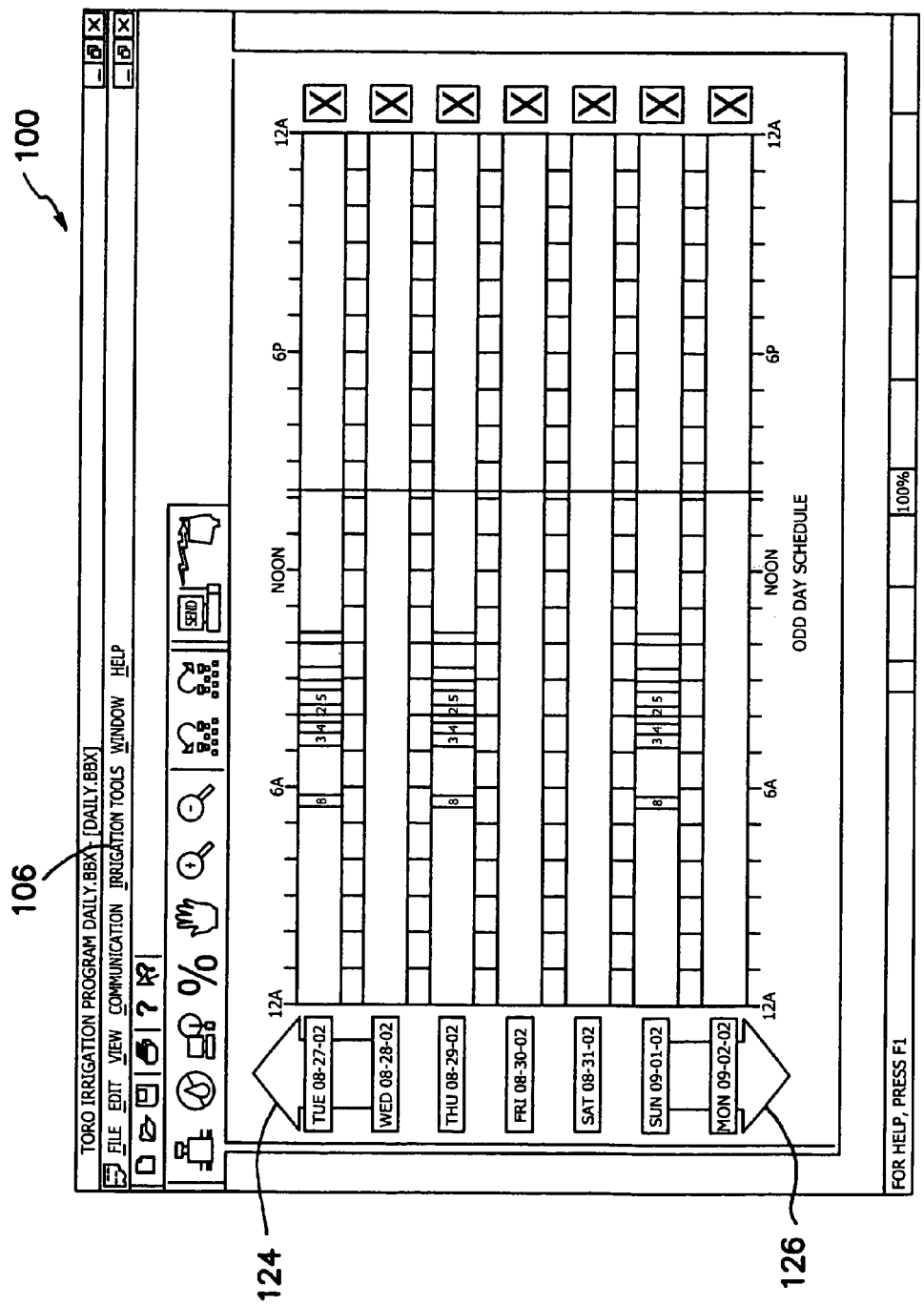
FIG. 11 shows an odd-days watering schedule.

When local ordinances or other watering restrictions so provide, watering can be scheduled for odd or even days of the month by selecting, e.g., "Odd Days" from the Irrigation Tools menu 106. This brings up the screen of FIG. 11, in which all even days are blocked out, but in which watering on odd days can be scheduled at will, as described above. It should be noted that if the last day of the month is odd, it is also blocked out so that watering cannot occur two days in a row. In the screen of FIG. 11, double-clicking the arrows 124, 126 moves the display to the first seven or last seven days of the month, respectively. As in the other seven-day screens, single-clicking the arrows 124, 126 moves the display up or down by one day.

Figure 12:
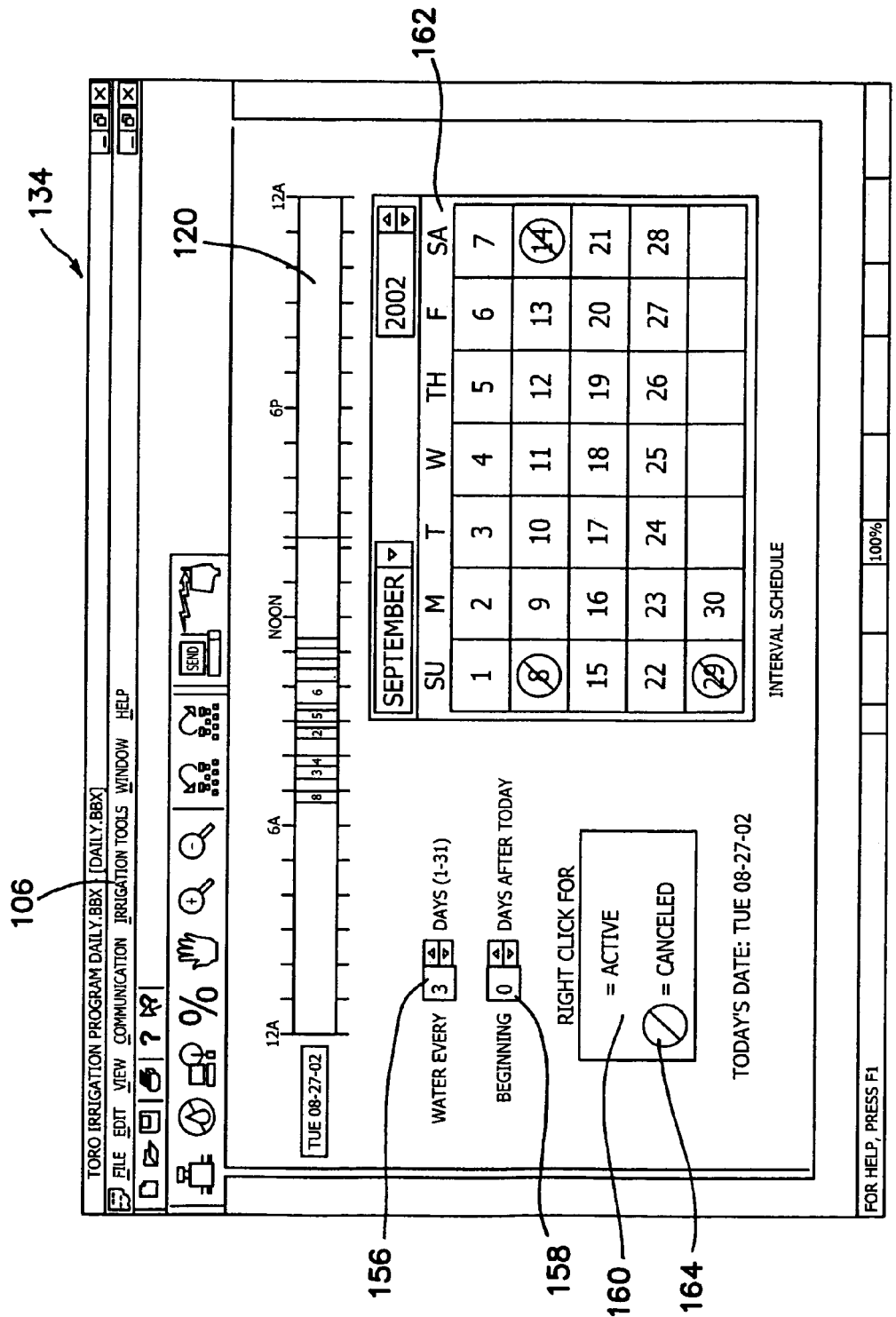
FIG. 12 shows an interval schedule screen.

FIG. 12 shows an Interval Schedule screen 154 which can also be selected from the Irrigation Tools menu 106. The screen 154 contains only one time band 120 for the current day. A schedule set up for that day will repeat at the intervals selected in the window 156, starting on the day selected in window 158. The selections in windows 156, 158 cause a water drop icon 160 to appear on the selected days in the calendar 162. Right-clicking on an icon 160 on the calendar 162 causes a Cancelled icon 164 to appear in its place, and watering will not take place on that day unless the Cancelled icon 164 is removed by right-clicking on it.

Figure 13:
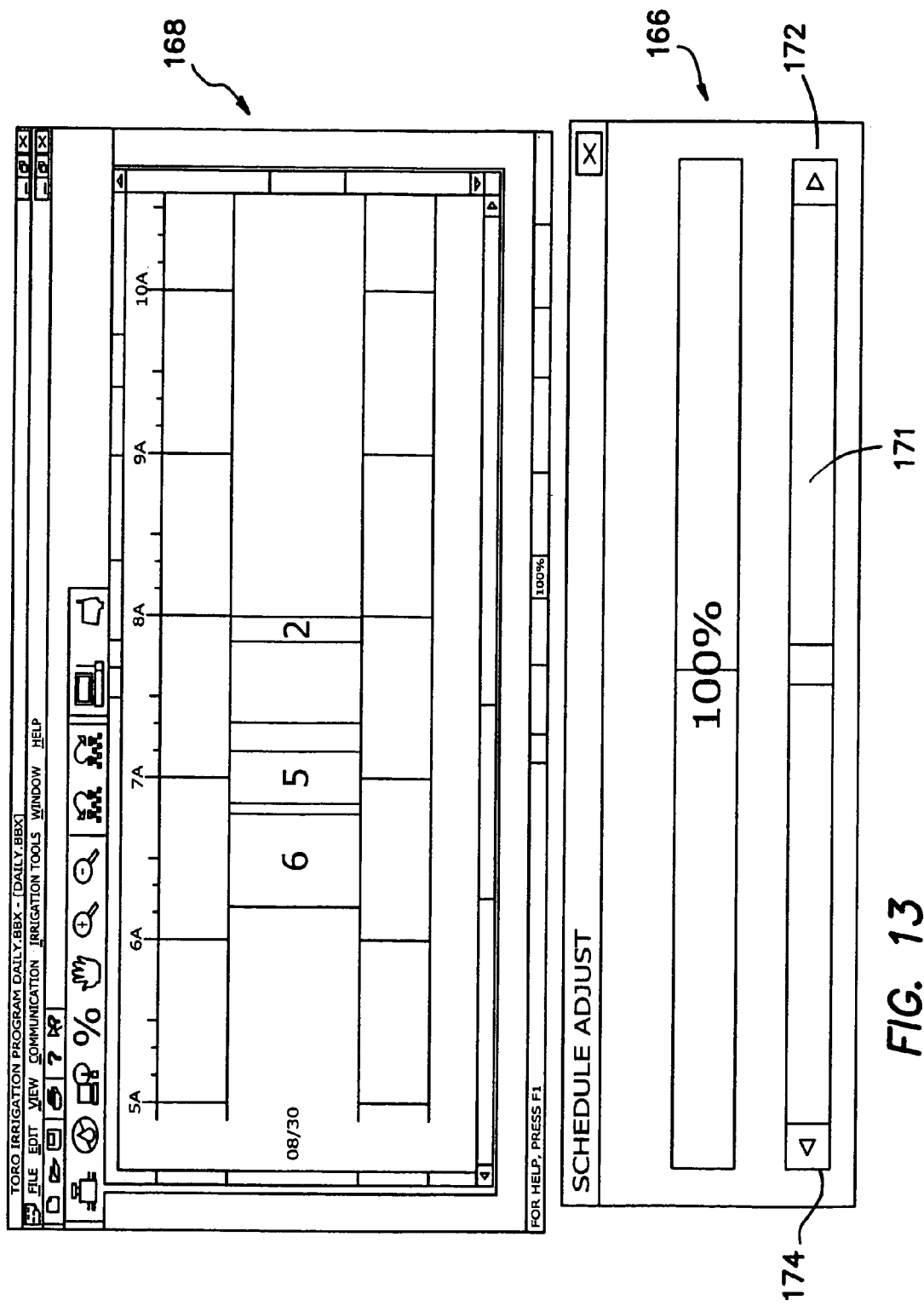
FIG. 13 shows an enlarged section of the screen of FIG. 8 with a global adjustment of 100%.
Figure 14:
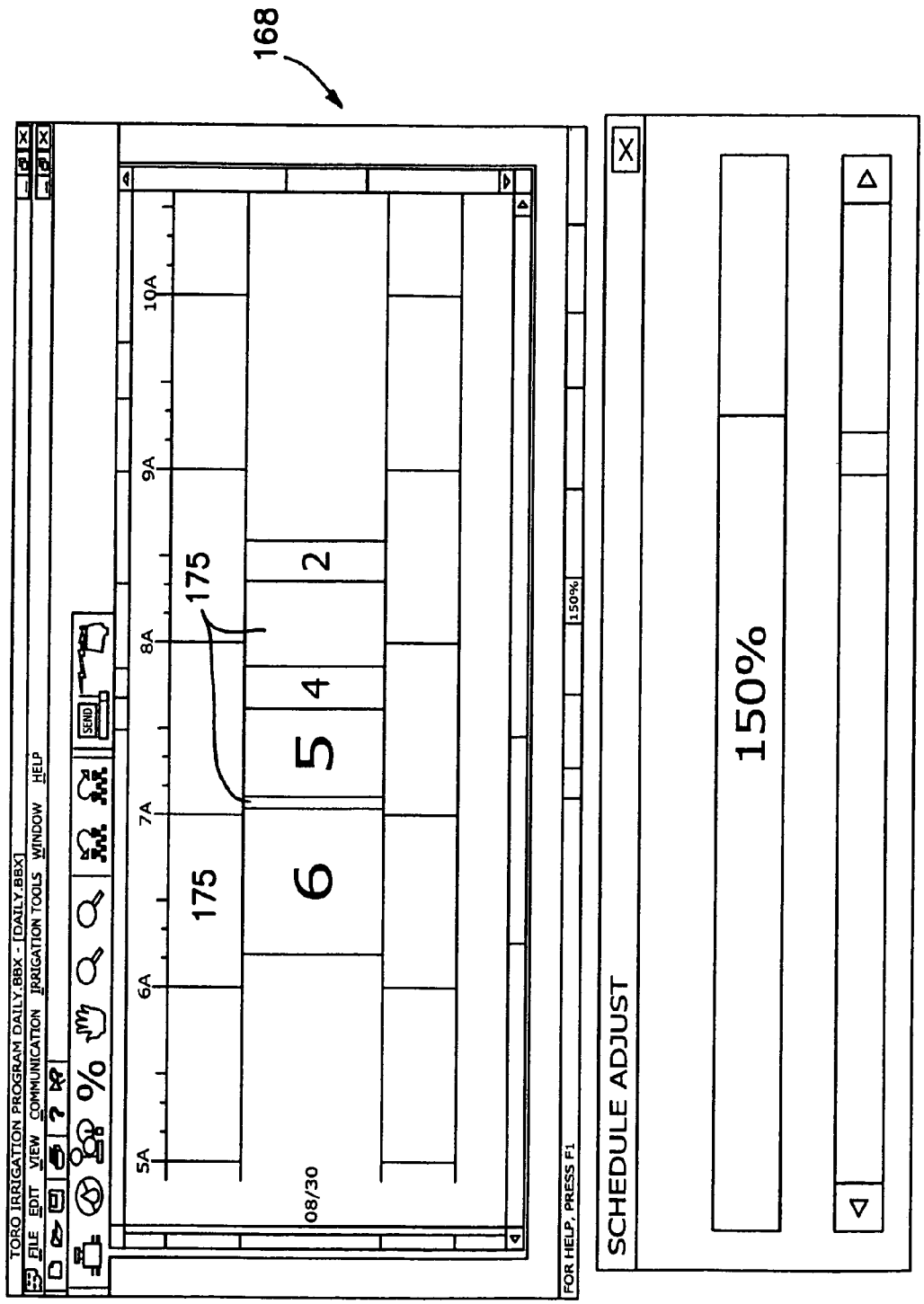
FIG. 14 shows the screen section of FIG. 13 with a global adjustment of 150%.

FIGS. 13 and 14 illustrate the operation of the Percent icon 111. Clicking that icon brings up the global adjustment screen 166 under the enlarged screen section 168. In order to globally adjust all the run time settings of the watering schedules entered into the system (e.g. in order to cope with an unseasonal hot or cold spell), the user can move the slider 170 or click the bar 171 or the arrows 172, 174 to vary the percentage of run time from the normal 100% to anywhere from 0% to 200%. Each click on the bar 171 on either side of the slider 170 increases or decreases the run time by 10%, while each click on one of the arrows 172, 174 increases or reduces it by 1%.

The effect of a global adjustment to 150% of the original settings is shown in FIG. 14. Comparing the schedules of FIG. 14 to those of FIG. 13, it will be seen that the width (i.e. run time) of each schedule box has been increased by 50%, but that the intervals 175 between the schedule boxes remain the same. It is conceivable, therefore, that for late-evening waterings, a 50% run time increase may push schedule boxes partly or wholly past midnight. If that is the case, any schedule portion past midnight is deleted. It is, however, stored in the PC's memory and is restored by the PC when the global adjustment is returned to 100%.

Figure 4:
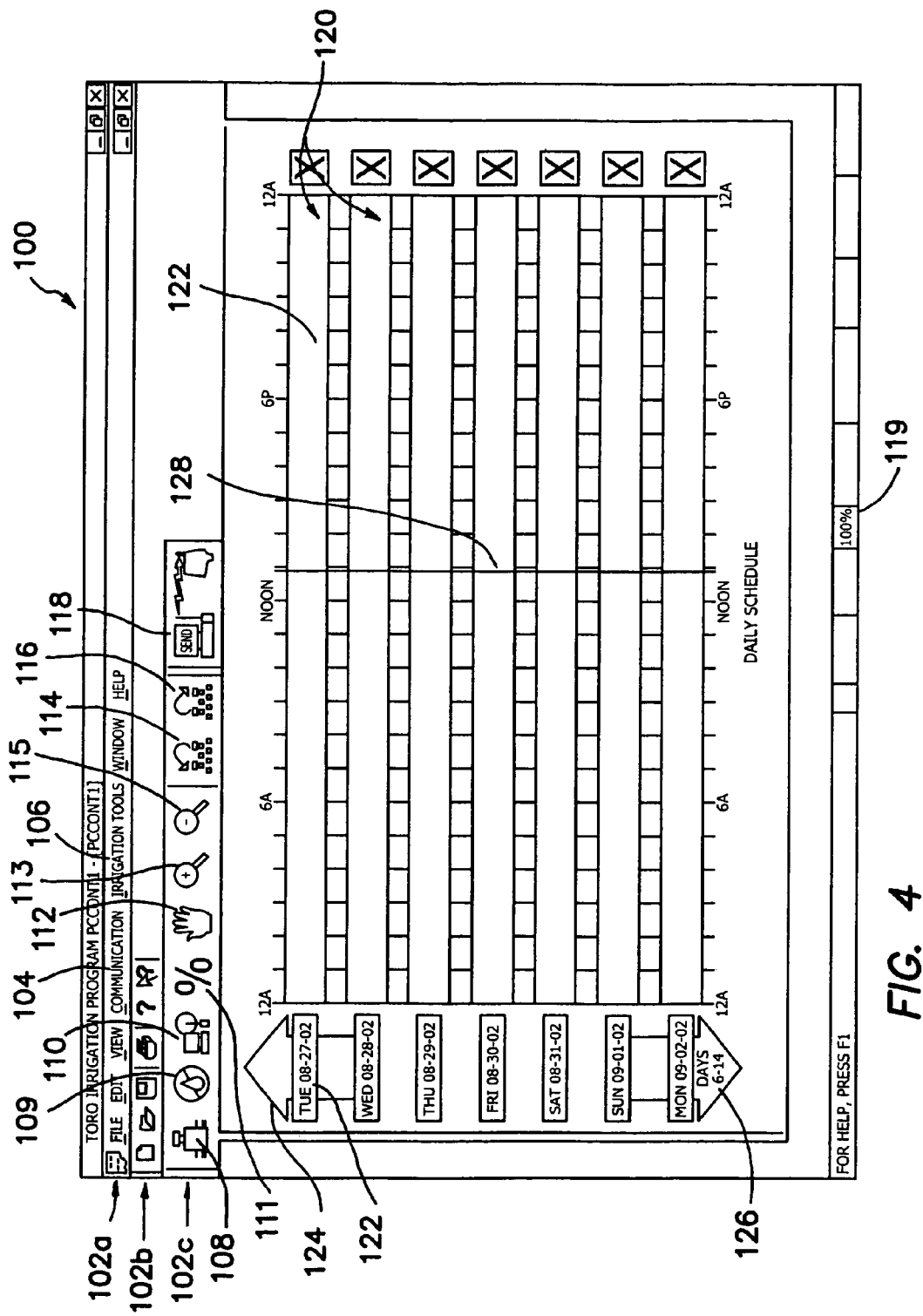
FIG. 4 shows the start-up screen of the control program.
Figure 5:
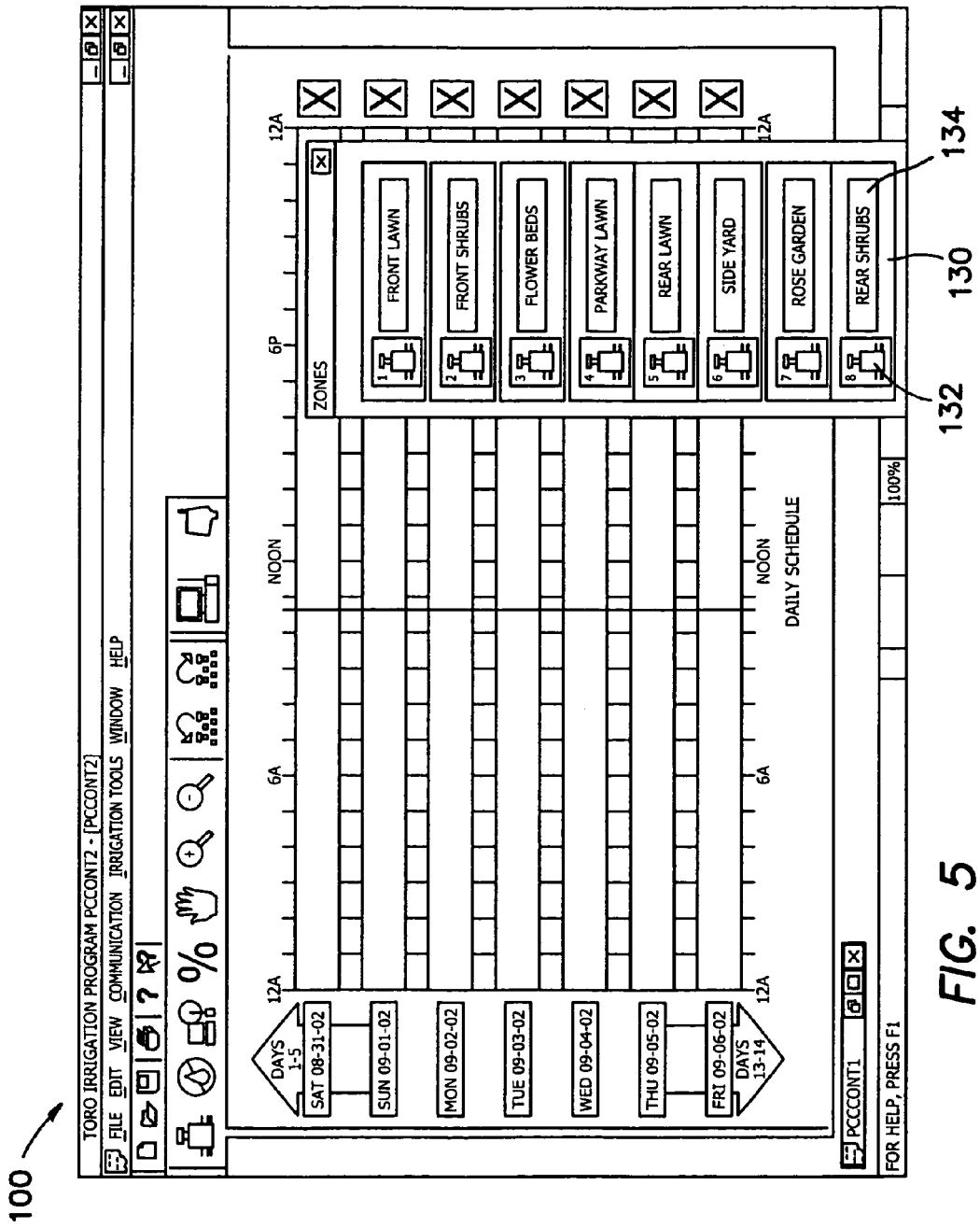
FIG. 5 shows the zones selection box.
Figure 15:
FIG. 15 shows the water cost calculator of the invention.

A water cost calculator, shown in FIG. 15, can be called up from the Irrigation Tools menu 106 (FIG. 4). In the screen of FIG. 15, which is essentially a dedicated spreadsheet, the white spaces such as 176 are selectable (as for example space 178) and changeable, while the grey spaces such as 180 are automatically calculated. In using the calculator of FIG. 15, the flow rate in gallons per minute for each zone (known from the number of sprinklers in the zone and the manufacturer's specifications for the type of sprinkler involved) is first entered in the corresponding spaces 176. Next, the user enters the number of gallons in a water company billing unit (usually a ccf, which equals about 750 gallons). Finally, the user consults his latest water bill and enters the number of billing units used and the charge for that amount of water. Based on the total run time, during the current month, of the schedules programmed into the system for each zone, the spreadsheet of FIG. 15 continuously calculates the water cost per gallon, the total number of gallons scheduled to be consumed that month, and the total cost of that water. This is particularly useful in conjunction with the global adjustment feature of FIGS. 13 and 14, as it permits an instant assessment of the cost effectiveness of any particular adjustment.

Figure 16:
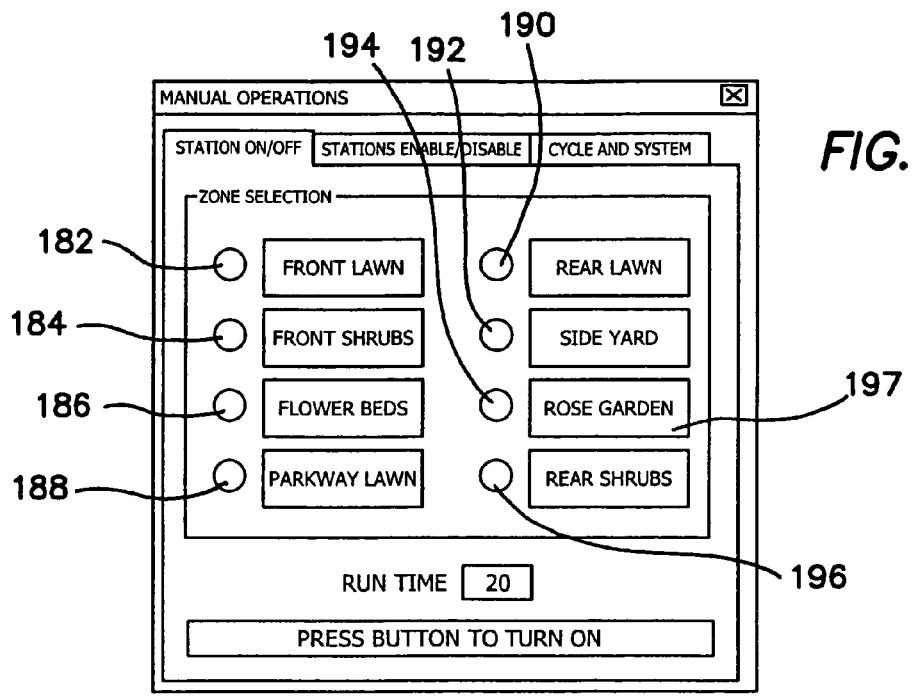
FIG. 16 shows the Station On-Off subscreen of the manual operations screen.
Figure 17:
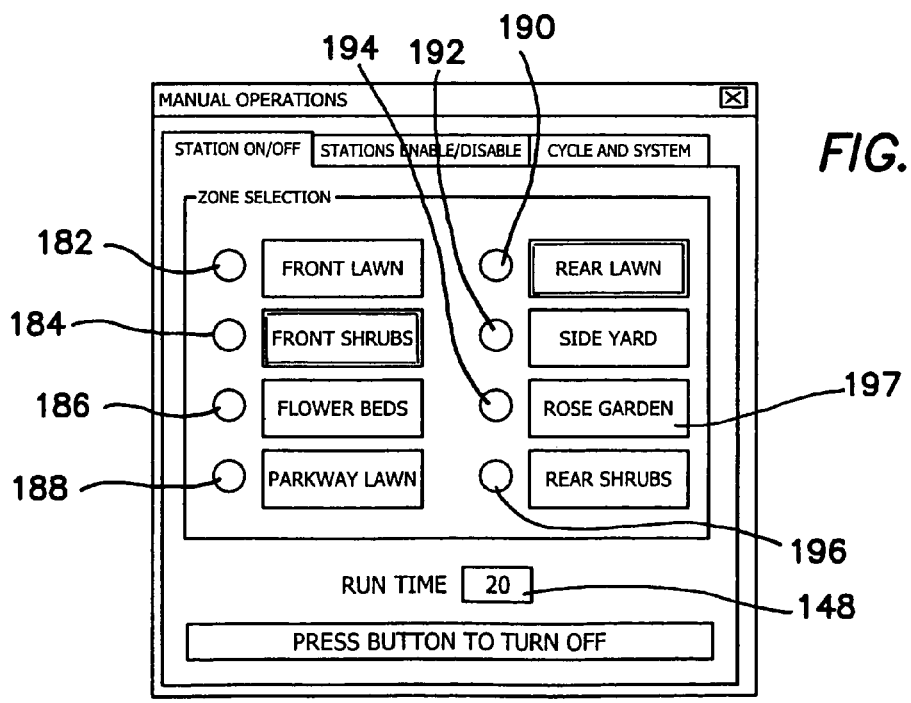
FIG. 17 shows the screen of FIG. 16 with manual operations entered.

Clicking the Manual icon 112 (FIG. 4) brings up the three-tab screen of FIG. 16. All of the indicators 182 through 196 are initially dark green. If the "Rose Garden" tag 197 is clicked, indicator 194 turns bright green, and the system sends out a signal to field controller 14 to turn zone 7 on for the twenty minutes currently entered into the Run Time box 198. Subsequent clicking on "Rear Lawn" and "Front Shrubs" (FIG. 17) causes zones 2 and 5 to be run immediately following the run of zone 7, in the order in which they were clicked, and each for the time entered in box 198. The indicators 184, 190 and 194 will turn bright green whenever their associated zone is running.

Figure 18:
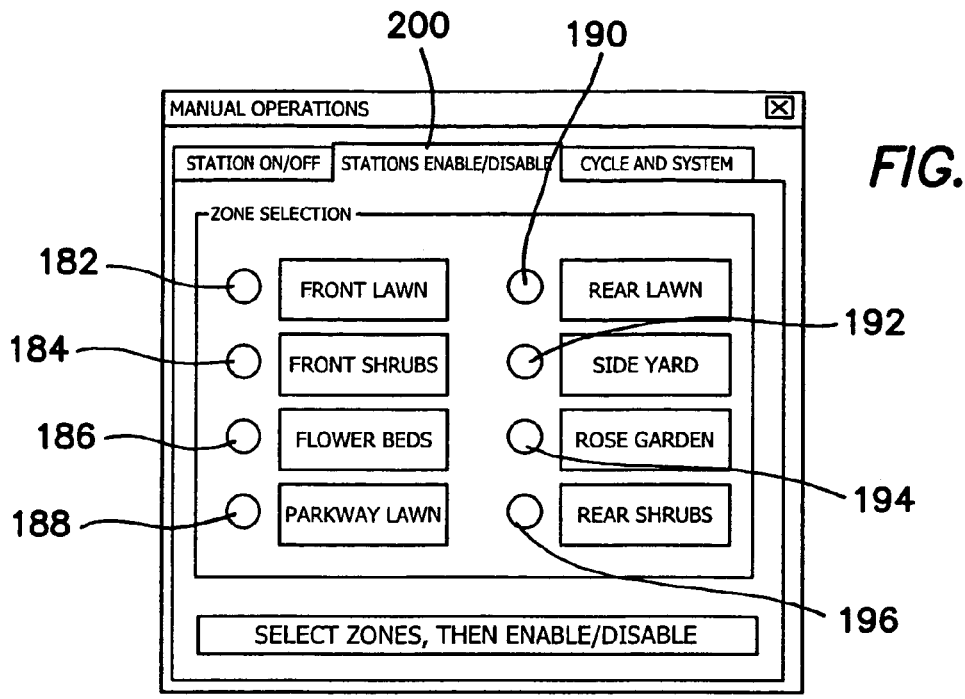
FIG. 18 shows the Stations Enabled/Disabled subscreen of the manual operations screen.

Clicking the "Stations Enable/Disable" tab 200 brings up the screen of FIG. 18. In this screen, all of the indicators 182 through 196 are originally bright green. If, for example, sprinkler heads break off in the rear lawn and the flower beds, those zones can be selectively shut off, pending repairs, by clicking on the labels "Flower Beds" and "Rear Lawn", and then clicking the "Stations Enable/Disable" tab 200. This causes indicators 186 and 190 to turn red, and causes the PC to send out a signal to the field controller 14 to inhibit operation of zones 3 and 5.

Figure 19:
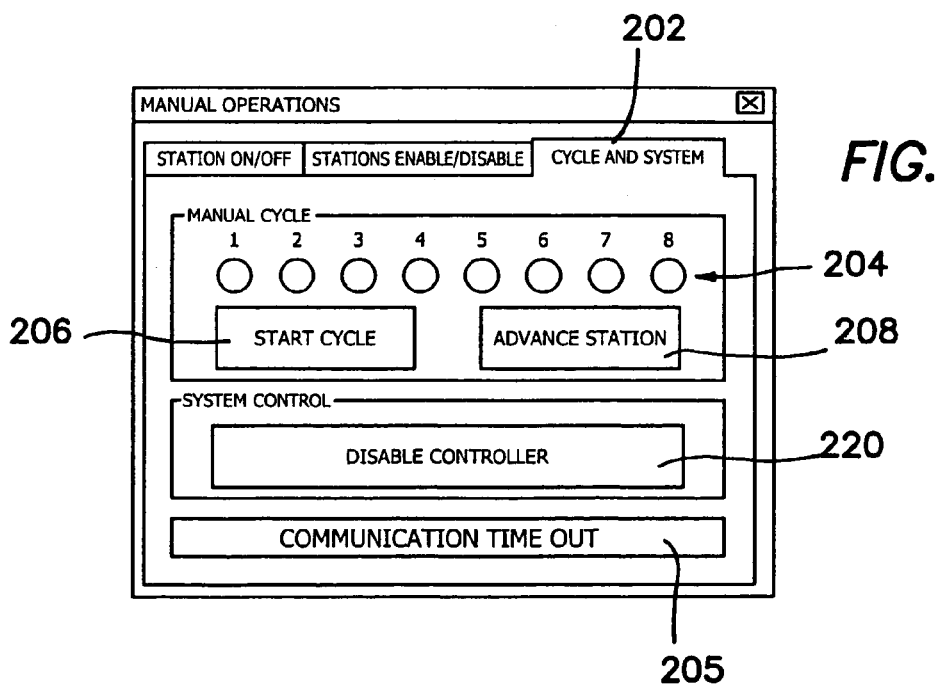
FIG. 19 shows the Cycle and System subscreen of the manual operations screen.

The "Cycle and System" tab 202 brings up the screen of FIG. 19. Each of the indicators 204 representing zones 1 through 8 is bright green when its zone is running, dark green when it is not, or red when it is disabled. A communication failure condition is indicated in box 205. Clicking button 206 stops any manual cycle previously programmed in FIG. 16. Button 208 stops the currently running zone and advances the cycle to the next selected zone. Button 220 is provided to completely disable the field controller 14 as, e.g., for performing system maintenance. Button 220 has the same function as the No-Watering icon 109 on the menu bar 102.

It will be understood that the foregoing description is only one example of a system according to the invention, and that the described system may be modified to cover a variety of situations and requirements within the ambit of the following claims.

We claim:

1. An irrigation control system, comprising:
  a) a computer;
  b) a field controller linked to said computer for transfer of data therebetween;
  c) a set of water valves arranged to be selectively turned on and off by said field controller;
  d) said field controller including a clock, a microprocessor and a memory, said memory being connected to store scheduling data and run time setting data for the operation of said water valves, and said microprocessor being arranged to operate said water valves in accordance with said clock and said data:
  e) said computer being programmed to receive from an operator data representing desired watering schedules and run time settings for each water valve of said set, and to selectively transfer said data to said field controller; and f) said computer being further programmed to present to said operator an interactive graphic of the time of day for a plurality of days % said computer receiving said data from said operator by placing water valve identifying indicia into selected positions on said graphic.

2. The system of claim 1, in which said memory is non-volatile.

3. The system of claim 1, in which said graphic includes:
i) a plurality of time bands extending in a first direction, each time band representing hours of a day, said time bands being juxtaposed in a second direction to represent a series of days.

4. The system of claim 3, in which the current time is indicated by a moving line extending in said second direction across said time bands.

5. The system of claim 1, in which selectable portions of said graphic can be repeatedly enlarged without affecting the effect of said indicia.

6. The system of claim 1, in which said graphic contains an icon which, if clicked, causes the watering schedule defined by said water valve indicia to be suspended.

7. The system of claim 1, in which said graphic contains an icon which monitors the data link between said computer and said field controller, and signals a failure to receive from said field controller a response to a polling or data transmission by said computer.

8. The system of claim 1, in which said data representing desired watering schedules and run time settings is selectably transmitted to said field controller by clicking a transmit icon on said graphic.

9. An irrigation control system, comprising:
a) a computer;
b) a field controller linked to said computer for transfer of data therebetween;
c) a set of water valves arranged to be selectively turned on and off by said field controller;
d) said field controller including a clock, a microprocessor and a memory, said memory being connected to store scheduling data and run time setting data for the operation of said water valves, and said microprocessor being arranged to operate said water valves in accordance with said clock and said data:
e) said computer being programmed to receive from an operator data representing desired watering schedules and run time settings for each water valve of said set, and to selectively transfer said data to said field controller; and
f) said computer being further programmed to present to said operator a graphic of the time of day for a plurality of days, said computer receiving said data from said operator by placing water valve identifying indicia into selected positions on said graphic, wherein said said graphic includes:
i) a plurality of time bands extending in a first direction, each time band representing hours of a day, said time bands being juxtaposed in a second direction to represent a series of days; and,
ii) a selectably displayable list of indicia representing the water valves of said set, watering schedules of said water valves being placed on said time bands by dragging and dropping indicia from said list onto said time bands in the form of schedule boxes having an edge representative of the start of watering and a width representative of run time.

10. The system of claim 9, in which said graphic includes directional arrows, and said displayed days are selected by clicking said arrows.

11. The system of claim 10, in which said schedule box can be expanded along its time band by dragging a trailing edge of said schedule box.

12. The system of claim 9, in which sets of schedule boxes in one time band can be copied to other time bands.

13. The system of claim 9, in which said graphic is arranged to display, wherever the cursor is placed over a scheduling box, a label showing the Identity of the valve involved and its start and run time.

14. The system of claim 9, in which clicking on a schedule box displays a dialog box which allows the parameters of the schedule box to be changed.

15. The system of claim 9, in which said time bands each represent the 24 hours of a day, and said graphic shows seven time bands representing a repeating week.

16. The system of claim 9, in which said time bands are arranged in a series beginning with the current day and ending with the last day of a selectable repetition cycle, the displayed days of said repetition cycle being selectable.

17. The system of claim 16, in which said computer is adapted to send to said field controller scheduling data representing turn-on of a water valve at the time corresponding to a leading edge of a corresponding schedule box, and a turnoff of said water valve at the time corresponding to a trailing edge of said schedule box.

18. The system of claim 9, in which alternate ones of said time bands can be selectively blocked to allow watering only on odd or even days.

19. The system of claim 9, in which said graphic further includes:
iii) watering inhibition indicia which, when clicked, inhibit watering on a specific day with which they are associated.

20. An irrigation control system, comprising:
a) a computer;
b) a field controller linked to said computer for transfer of data therebetween;
c) a set of water valves arranged to be selectively turned on and off by said field controller;
d) said field controller including a clock, a microprocessor and a memory, said memory being connected to store scheduling data and run time setting data for the operation of said water valves, and said microprocessor being arranged to operate said water valves in accordance with said clock and said data;
e) said computer being programmed to receive from an operator data representing desired watering schedules and run time settings for each water valve of said set, and to selectively transfer said data to said field controller; and
f) said computer being further programmed to selectably present to said operator a graphic having a time band representing time in a day, any watering schedule established on said time band being repeated at a selectable interval of days beginning on a selectable day.

21. The system of claim 20, in which said graphic further includes a calendar for a selectable month, with interval-selected watering days being marked by a watering icon.

22. The system of claim 21, in which watering days can be selectively inhibited, and in which a no-watering icon is substituted for said watering icon on inhibited days.

23. An irrigation control system, comprising:
a) a computer;
b) a field controller linked to said computer for transfer of data therebetween;
c) a set of water valves arranged to be selectively turned on and off by said field controller;
d) said field controller including a clock, a microprocessor and a memory, said memory being connected to store scheduling data and run time setting data for the operation of said water valves, and said microprocessor being arranged to operate said water valves in accordance with said clock and said data;

e) said computer being programmed to receive from an operator data representing desired watering schedules and run time settings for each water valve of said set and to selectively transfer said data to said field controller, and f) said computer being further programmed to selectably present to said operator a graphic representing a selectable global adjustment of the run times of all said water valves programmed into said computer.

24. An irrigation control system, comprising:
a) a computer;
b) a field controller linked to said computer for transfer of data therebetween; and
c) a set of water valves arranged to be selectively turned on and off by said field controller;
d) said field controller including a clock, a microprocessor and a memory, said memory being connected to store scheduling data and run time setting data for the operation of said water valves, and said microprocessor being arranged to operate said water valves in accordance with said clock and said data;
e) said computer being programmed to receive from an operator data representing desired watering schedules and run time settings for each water valve of said set, and to selectively transfer said data to said field controller; and
f) said computer being further programmed to present to said operator a graphic in the form of a dedicated spreadsheet which, upon entry of the flow rate of each said water valve and the cost data of a known water consumption, calculates and displays the anticipated water use and cost of the irrigation schedule using said desired watering schedules.

25. An irrigation control system, comprising;
a) a computer;
b) a field controller linked to said computer for transfer of data therebetween;
c) a set of water valves arranged to be selectively turned on and off by said field controller;
d) said field controller including a clock, a microprocessor and a memory, said memory being connected to store scheduling data and run time setting data for the operation of said water valves, and said microprocessor being arranged to operate said water valves in accordance with said clock and said data;
e) said computer being programmed to selectively transfer run time data to said field controller; and
f) said computer being further programmed to present to said operator a selectable set of graphics presenting indicia which, when clicked, manually disable or run selectable ones of said water valves.

26. An irrigation control system, comprising:
a) a computer;
b) a field controller linked to said computer for transfer of data therebetween;
c) a set of water valves arranged to be selectively turned on and off by said field controller, d) said field controller including a clock, a microprocessor and a memory, said memory being connected to store scheduling data and run time setting data for the operation of said water valves, and said microprocessor being arranged to operate said water valves In accordance with said clock and said data;

e) said computer being programmed to receive from an operator data representing desired watering schedules and run time settings for each water valve of said set, and to selectively transfer said data to said field controller; and f) said computer being further programmed to present to said operator a graphic of the time of day for a plurality of days, said computer receiving said data from said operator by placing water valve identifying indicia into selected positions on said graphic;

g) a remote linked to said field controller for transmitting commands thereto; and h) said remote including means for transmitting to said field controller only manual operation and disabling commands.

27. An irrigation control system, comprising:
a) a computer;
b) a field controller releasably linkable to said computer for transfer of data therebetween;
c. a set of water valves arranged to be selectively turned on and off by said controller;
d) said field controller being a free-standing unit including a clock, a microprocessor and a memory, said memory being connected to store scheduling data and run time setting data for the operation of said water valves and said microprocessor being arranged to operate said water valves in accordance with said clock and said data regardless of whether said field controller is linked to said computer;
e) said computer being programmed to receive from an operator data representing desired watering schedules and run time settings for each water valve of said set, and to selective transfer said data to said field controller memo when said field controller and computer are linked;
and wherein said field controller is polled continually by said computer while linked thereto to inform said computer of the status of said field controller, and said clock is synchronized with the clock of said computer only as a part of a schedule data transmission to or from said field controller.

28. The system of claim 27, wherein said computer is linked to said field controller by a radio link.

29. The system of claim 27 wherein said data being transferred to said field controller includes an access code for allowing said field controller to accept said transferred data from any computer cognizant of said access code.

30. The system of claim 27, wherein said computer displays said status of said field controller unless said data has been modified on said computer but has not yet been transmitted to said field controller.

* * * * *